United States Patent
Hohmann et al.

[11] Patent Number: 6,161,629
[45] Date of Patent: Dec. 19, 2000

[54] POWER WRENCH

[76] Inventors: Jörg Hohmann, Uhlandstrasse 6a, 59872 Meschede, Germany; Frank Hohmann, Beethovenstrasse 9, 59581 Warstein, Germany

[21] Appl. No.: 09/308,545

[22] PCT Filed: Oct. 29, 1997

[86] PCT No.: PCT/EP97/05974

§ 371 Date: Jul. 16, 1999

§ 102(e) Date: Jul. 16, 1999

[87] PCT Pub. No.: WO98/22263

PCT Pub. Date: May 28, 1998

[30] Foreign Application Priority Data

Nov. 19, 1996 [DE] Germany .............................. 196 47 813

[51] Int. Cl.$^7$ .............................. B25B 23/14; B23P 19/06
[52] U.S. Cl. .......................... 173/181; 173/182; 173/183; 73/761; 73/763; 73/862.23
[58] Field of Search .................................. 173/176, 180, 173/181, 182, 183, 2; 81/467, 470, 469; 73/761, 763, 862.23, 862.21

[56] References Cited

U.S. PATENT DOCUMENTS

| | | |
|---|---|---|
| 4,375,121 | 3/1983 | Sigmund . |
| 4,418,765 | 12/1983 | Mori et al. . |
| 4,685,050 | 8/1987 | Polzer et al. ............................. 73/761 |
| 5,014,794 | 5/1991 | Hansson ................. 173/181 |
| 5,154,242 | 10/1992 | Soshin et al. . |
| 5,285,857 | 2/1994 | Shimada ................................. 173/182 |
| 5,289,886 | 3/1994 | Shikata et al. . |
| 5,315,501 | 5/1994 | Whitehouse ........................ 73/862.23 |
| 5,457,866 | 10/1995 | Noda ..................................... 173/183 |

FOREIGN PATENT DOCUMENTS

| | | |
|---|---|---|
| 33 18 910 A1 | 11/1984 | Germany . |
| 33 27 964 A1 | 2/1985 | Germany . |
| 41 28 427 C2 | 3/1992 | Germany . |
| 43 07 131 A1 | 9/1994 | Germany . |
| 43 07 131 C2 | 9/1994 | Germany . |
| 43 16 331 A1 | 11/1994 | Germany . |
| 44 04 419 A1 | 8/1995 | Germany . |
| 4-164578 | 6/1992 | Japan . |
| 6-170662 | 6/1994 | Japan . |

*Primary Examiner*—Scott A. Smith
*Attorney, Agent, or Firm*—Robert W. Becker & Associates

[57] ABSTRACT

A power screwdriver has a drive unit and an input circuit for inputting screw size, material quality, pitch, and clamping length of a screw. An evaluation circuit is provided for determining a nominal prestress force based on input screw size, material quality, and clamping length, for determining a nominal torque based on the nominal prestress force and the pitch, and for determining the screw clamping angle resulting from the nominal prestress force and the pitch. A sensing device for sensing the actual torque is provided, and a further sensing device for sensing the actual screw clamping angle is present. A control and switch-off device controls further rotation of the drive unit when the actual torque coincides with the nominal torque and switches off the drive unit when the actual screw clamping angle coincides with the nominal screw clamping angle. The nominal torque, based on which the additional rotation o f the drive unit is controlled until the nominal screw clamping angle is reached, is set to a value which is smaller than the torque corresponding to the nominal pretension force. An additional rotation angle of the drive unit, for reaching the nominal screw clamping angle corresponding to the nominal prestress force, is determined based on the difference between the nominal screw clamping angle and the adjusted screw clamping angle corresponding to the preset nominal torque and is used for switching off the drive unit.

6 Claims, 2 Drawing Sheets

POWER WRENCH

BACKGROUND OF THE PRIOR ART

The invention relates to a power screwdriver with a drive unit, a sensing device for the actual torque as well as optionally for the actual screw clamping angle, and an electronic control of the revolutions per minute and/or the torque and/or the screw clamping angle.

In German patent 43 07 131 a power screwdriver is disclosed having a drive unit having a with planetary gear downstream thereof, a torque detection at the drive shaft, an evaluation electronic circuit, and a switch-off device for the drive unit, a sensing device for detecting the rotational position of the drive unit whereby the switch-off device has a adjustable preset device for a certain torque determined by the torque detection device, and additionally an adjustable preset device, for a certain follower path determined by the rotational position detection device and wherein switching off of the drive unit after reaching the preset torque is carried out followed by a further rotation by an adjusted follower path.

Before performing a tightening operation, the required torque as well as optionally the required follower path are preset by the corresponding adjusting elements. Subsequently, the power screwdriver is placed onto the screw element and a support leg is moved against a fixed abutment. After starting the drive unit, the tightening operation is performed and the screw element is tightened so that the torque increases. The measuring-technologically determined torque value is compared to the torque value that is preset, and, when both values are identical, an internal switching signal is provided for the follower control. Based on the actual rotational position the drive unit is then rotated further by the preset follower path. After completion of the preset follower path, the switching signal is released by the switch-off device for switching off the drive unit and thus terminating the threading operation.

In the known power screwdriver the operator must determine with respect to the screw size and the material quality the required nominal torque with the aid of tables and must input the data into the electronic input device. The follower path must also be determined by the operator and optionally entered into the electronic input device. The function of the follower path and how to determine it is not disclosed in the German patent 43 07 131. Also, the measuring-technologically detected torque value depends greatly on external circumstances such as thread friction and is no precise measure for the actually reached screw pretension.

The invention has the primary object to simplify the operation of a power screwdriver of the aforementioned kind and to eliminate operational errors, without requiring special knowledge by the operator. Furthermore, damage to the screws to be tightened and to the power screwdriver are to be prevented, the precision with which the tightening actions of the screws is effected is to be increased, the effects of the rotational energy of the drive unit during switch-off onto the tightening of the screw is to be reduced or eliminated, and a safe transmission of the measuring and control signals is to be ensured.

SUMMARY OF THE INVENTION

Based on this problem, as a simplification of operation and for avoiding operational errors of the power screwdriver, it is suggested that the electronic input device is inventively designed for inputting the screw size, the pitch, and the material quality and that the electronic evaluation device determines a nominal torque based on the input screw size, the pitch, and the material quality, whereby the actual torque is determined by a sensing device and a switch-off effects the switching off of the drive unit when the actual torque and nominal torque coincide.

The operator thus no longer must determine, based on tables, the nominal torque for a certain screw size and pitch with a certain material quality and must no longer input such data into the electronic input device. Instead it is sufficient to input the screw size, the pitch, and the material quality into the electronic input device so that the thus resulting nominal torque is determined by the electronic evaluation device and serves for controlling the power screwdriver. Erroneous adjustments, which result in damage to the screws to be tightened and the power screwdriver, are prevented because no special knowledge is required by the operator.

Based on the aforementioned problem it is further suggested for simplifying operation and for increasing the precision during tightening of the screw by the power screwdriver, that the electronic input device for is desired inputting the screw size of the material quality, the pitch, and the clamping length, that a nominal pretension force are determined based on the input data by the electronic device, a nominal torque and screw clamping angle whereby a sensing device determines the actual torque and a sensing device detects the actual screw clamping angle and a control and switching device is provided witch effects further rotation of the drive unit upon coinciding of the actual torque and the nominal torque and switching off of the drive unit upon coinciding of the actual screw clamping angle and the nominal screw clamping angle.

This inventive control device for the power screwdriver is based on the idea that the precise adjustment of the screw prestress force may result from monitoring the screw expansion because the screw expansion, according to Hook's Law, is a linear function of the prestress force, the cross-section, the clamping length, and the module of elasticity. This screw expansion is directly proportional to the screw clamping angle for geometric reasons, but the zero value of the expansion cannot be directly determined from the screw rotation because the screw is first rotated with minimal torque until the parts to be clamped contact one another, the point of connection, and only thereafter a linear increase of the prestress force with screw expansion will occur. The nominal prestress force can be determined by computation of the input screw size, the material quality, and the clamping length, and, based on this, in connection with the input pitch, the nominal torque and the resulting screw clamping angle can be determined. It is thus sufficient to first measure the actual torque to a predetermined level and to then allow the control and switch-off device to act on the power screwdriver such that beginning at this level the addition rotation of the drive unit by a certain angle, which results in the desired nominal prestress, is carried out.

In this inventive solution the operation is also greatly simplified and operational errors are prevented because all data are input into the electronic input device and the electronic evaluation device will automatically determine the control data based on the input.

Preferably, the nominal torque which is the starting point for further rotation of the drive unit until the nominal screw clamping angle has been reached, is set to a value which is smaller then the torque corresponding to the nominal prestress force and the additional angle of rotation of the drive unit until the nominal screw clamping angle corresponding to the prestess force has been reached is determined based on the difference between the nominal screw clamping angle and the for the screw clamping angle corresponding to the input nominal torque and is used for switching off the drive unit.

It is especially preferred that the nomiani torque is adjusted to 10% to 20% of the torque corresponding to the nominal prestess force and that the further rotational angle is adjusted to 90% to 80% of the nominal screw clamping angle corresponding to the nominal prestress force.

It has been shown in practice that after reaching 10% to 20% of the torque corresponding to the nominal prestress force, the linear range of the screw expansion has been reached so that the further additional rotational angle can be adjusted to 90% to 80% of the nominal screw clamping angle corresponding to the nominal prestress force, and this results in a very precise tightening of the screw with a desired prestress force because inexactness during the starting phase of tightening of the screw will have only a small impact onto the final prestress force.

Based on the aforementioned problem, a power screwdriver is suggested in which the effect of the rotational energy of the rotating parts onto the screw prestress force is reduced or eliminated and which comprises an electronic input device for inputting a nominal torque or for inputting the screw size, the pitch, and the material quality or for inputting the screw size, the pitch, the material quality, and the clamping length, optionally comprises an electronic evaluation device for determining a nominal torque based on the input screw size, the pitch, and the material quality and/or for determining a nominal prestress force and the values to be determined therefrom, such as nominal torque and/or nominal screw clamping angle, further comprises a sensing device for the actual torque and/or the actual screw clamping angle, and further comprises a control and switch-off device for a continuous reduction of the rpm of the drive unit with decreasing difference between the nominal torque and the actual torque or between the nominal screw clamping angle and the actual screw clamping angle and for switching of the drive unit upon coinciding of the actual torque and the nominal torque or the actual screw clamping angle and the nominal screw clamping angle. The reduction of rpm can be started immediately with increase of the torque, however, it is also possible to perform the threading operation first with high rpm and, only after reaching a predetermined moment, to start reducing the rpm. This results in a shortening of the threading operation.

The control and switching device for controlling the rpm of the drive unit effects that the rotational energy of the power screwdriver upon approaching the nominal value is more and more reduced and the rotational energy, at the moment of switching off, is identical or substantially identical to zero and has no effect on the actual prestress force.

Such a rpm control can be performed in any power screwdriver with electronic torque limitation or also in a power screwdriver with a control and switch-off device having an electronic screw clamping angle limitation. Especially advantageous is the use of the inventive rpm control in connection with the inventively embodied electronic input device for inputting the screw size, the pitch, and the material quality and the electronic input device for inputting the screw size, the material quality, the pitch, and the clamping length.

It may also be advantageous to design the power screwdriver of the aforementioned kind with a sensing device for the actual torque such that the actual torque of a already tightened screw is measured by a slight further rotation and the electronic evaluation device then determines based thereon the nominal torque and/or a nominal screw clamping angle for a further tightening of the screw to a value that matches the input data.

With respect to space conditions within the housing of the power screwdriver, it is advantageous when at least the control and switch-off device and optionally also the electronic evaluation device are integrated into the drive unit, while the input circuit and optionally the evaluation circuit can be embodied as independent control devices that act onto the control and switch-off or onto the evaluation circuit without cable connection with bi-directional or uni-directional transmission of data. For this purpose, the remote transmission can be embodied as a unidirectional or bi-directional infrared path and a corresponding infrared signal receiver can be arranged at the drive unit.

Especially when the control and switch-off device is integrated into the drive unit, while the input circuit and the evaluation circuit are embodied as independent control devices, they can be combined in a portable computer which has a bi-directional IrDA interface with infrared transmission while a corresponding interface at the drive unit is provided.

Uni-directional infrared data transmission devices are known as infrared remote controls for T.V. sets. They allow a uni-directional data transmission across distances of up to 36 meters under optimal conditions. With these uni-directional infrared data transmission systems the stand by current of the sender is substantially equal to zero while during operation the current is only of a size of a few milliampere. The receiver also requires only a current of a few milliampere, i.e., it is in a range which is possible for portable power screwdrivers with conventional current supplies.

Portable computers are often already equipped with IrDA interface. They are in the form of standardized bi-directional interfaces with infrared transmission. A respective interface is arranged at the power screwdriver and this IrDA component has a minimal current consumption of a few microampere in the stand by position and of a few milliampere in the activated state.

Advantageous for all infrared transmission systems is the optimized galvanic separation, which is a result of its operating principle, as well as the minimal cost for standard components. Furthermore, interferences result by emission of disturbing signals or interference by signals. When employing standardized IrDA components, for securing the transmitted data control bits can be sent. Furthermore, a portable computer which is connected to the power screwdriver by a bi-directional infrared interface, is suitable to evaluate and document a large amount of data and to thus statistically evaluate a large number of threading processes.

When the input circuit has a display, it can be designed such that the display shows the input values, the resulting nominal values, and/or the actual torque course and/or the course of the actual screw rotation angle.

BRIEF DESCRIPTION OF THE DRAWINGS

The invention will be explained in the following with the embodiment shown in the drawing. The drawing shows.

DESCRIPTION OF PREFERRED EMBODIMENTS

Figure 1:
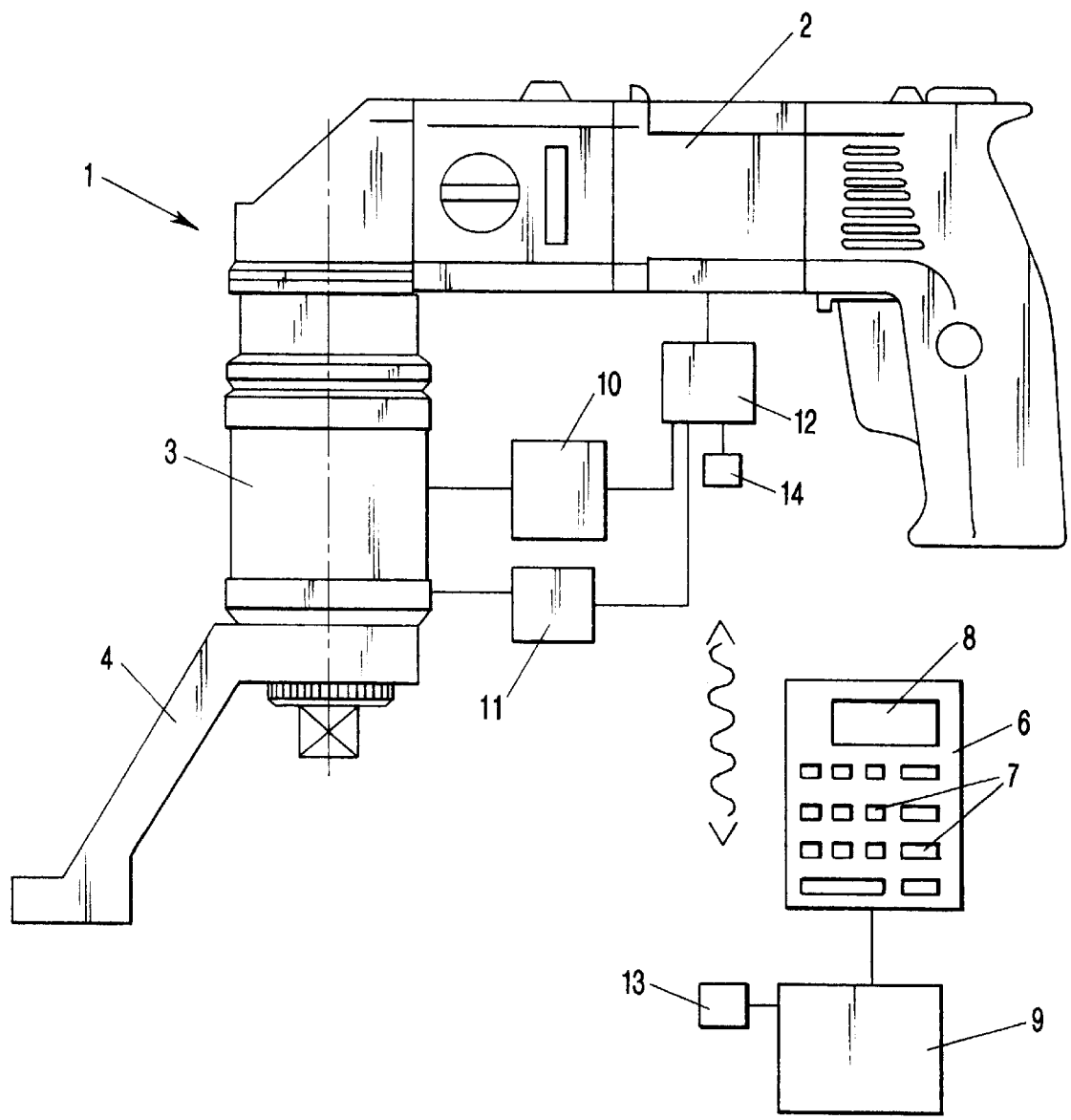
FIG. 1 a schematic representation of a power screwdriver and the electronic control elements.

In general, the reference 1 indicates the power screwdriver having a drive unit 2 which is represented as an electric drive unit which, however, can also be operated pneumatically or hydraulically. A planetary gear system 3 is connected to the drive unit 2 which, as is shown, has an angular drive but can also extend coaxially to the main rotational axis of the drive unit. The planetary gear system 3 provides a reduction of the rpm of the drive unit 2 and increases the achievable torque.

At a neck of the planetary system 3 in the area of the square output shaft 5 of the planetary gear system 3, a support leg 4 is stationarily connected which, upon tightening of the screw, is moved against a fixed abutment and in this manner receives the reaction moment. The square shaft 5 is designed for receiving a socket wrench.

The drive unit 2 comprises an input circuit 6 which has a keyboard 7 and, optionally, a display 8 for showing the input data. With this input circuit 6, the screw size, material quality, the pitch, the clamping length can be input and also displayed on display 8. These values are guided into the evaluation circuit 9 which determines, based on the input screw size and the material quality, nominal torque or, based on the screw size, the material quality, and the clamping length, nominal prestress force and based thereon, when taking into consideration the pitch, a resulting nominal torque and, finally, based on the nominal prestress force and the pitch, a resulting screw clamping angle. These determined nominal values and/or the current actual torque coarse and/or the current actual screw rotational angle can be displayed on the display 8.

The planetary gear system 3 cooperates with a sensing device 10 for the actual torque and a sensing device 11 for the actual screw clamping angle. The sensing devices 10, 11 can be embodied as a conventional contactless sensing device as is, for example, known from German patent 43 07 131. The measured values of the sensing device 10, 11 are guided to the control and switch-off device 12 which acts on the drive unit 2.

Preferably, the sensing devices 10, 11 and the control and switching device 12 and optionally the evaluation circuit 9 are integrated into the drive unit 2, while the input 6 circuit and optionally the evaluation circuit 9 are embodied independent of the power screwdriver 1 as a control device and are connected to the power screwdriver 1 by a cable or, in an especially preferred embodiment, without cable by remote transmission of data into an electronic circuit integrated into the power screwdriver 1. When an infrared remote control is used, the data input into the input circuit 6 or the control data that have been processed by the evaluation circuit 9 can be transmitted without cable to the power screwdriver 1. When the input circuit 6 and the evaluation circuit 9 are combined in a portable computer and when this computer is provided with a so-called IrDA interface 13 as a remote transmission device, the infrared signals can be transmitted by this interface onto a matching interface 14 at the power screwdriver 1 which is in communication with the control and switch-off device 12. This IrDA interface 13 and the corresponding interface 14 are embodied as standardized bi-directional interfaces with infrared transmission for distances of u J) to one meter and transmission rates of more than 1 MBit/S. These IrDA components 13, 14 have in standby mode a minimal current consumption of a few micoampere and in the activated stage of a few milliampere which is in a range that is feasible for current supplies of transportable power screwdrivers. Especially advantageous in regard to these infrared transmission systems is the optimal galvanized separation of the input circuit 6 and the evaluation circuit 9 from the power screwdriver 1, which is a result of the operating principle, and the minimal costs by using the standardized components. These standardized components have a minimal size so that they can be integrated without problems into the housing of the power screwdriver 1.

When only the input circuit 6 is independent of the power screwdriver 1, a bi-directional data transmission is not required so that in this case it is also possible to employ infrared remote controls known from T.V. sets for a unidirectional remote transmission of data. This infrared remote control have a minimal standby current, while the current consumption is a few milliampere when active.

When the inventive power screwdriver 1 operates only with torque limitation, only the screw size and the material quality must be input into the input circuit 6 so that the evaluation circuit 9 determines the corresponding nominal torque. During tightening of the screw the sensing device 10 measures the actual torque and the control and switch-off device 12 switches off the drive unit 2 once the actual torque corresponds to the nominal torque.

When a highly precise tightening of the screw to a nominal prestress force is required, which can be determined based on the screw size, the material quality, and the clamping length and to which the screw expansion is proportional, the input circuit 6 is used to input the screw size, the material quality, the pitch, and the clamping length so that the evaluation circuit 9 will determine a nominal prestress force, a nominal torque, and a nominal screw clamping angle.

Upon tightening the screw, the sensing device 10 will measure the actual torque and the sensing device 11 will measure the actual screw clamping angle, and these values are supplied to the control and switch off device 12. The control and switch-off device 12 is designed such that it effects the additional rotation of the drive unit by a certain angle is affected upon coinciding of the actual torque with the nominal torque and switches off the drive unit 2 when the actual screw clamping angle coincides with the nominal screw clamping angle. The nominal torque based on which the additional rotation of the drive until 2 upon reaching of the nominal screw clamping angle is controlled, is smaller than the torque corresponding to the nominal prestress force, preferably it corresponds to 10% to 20% of the torque corresponding to the nominal prestress force, while the additional rotation angle is then 90% to 80% of the nominal screw clamping angle corresponding to the nominal prestress force.

Figure 2:
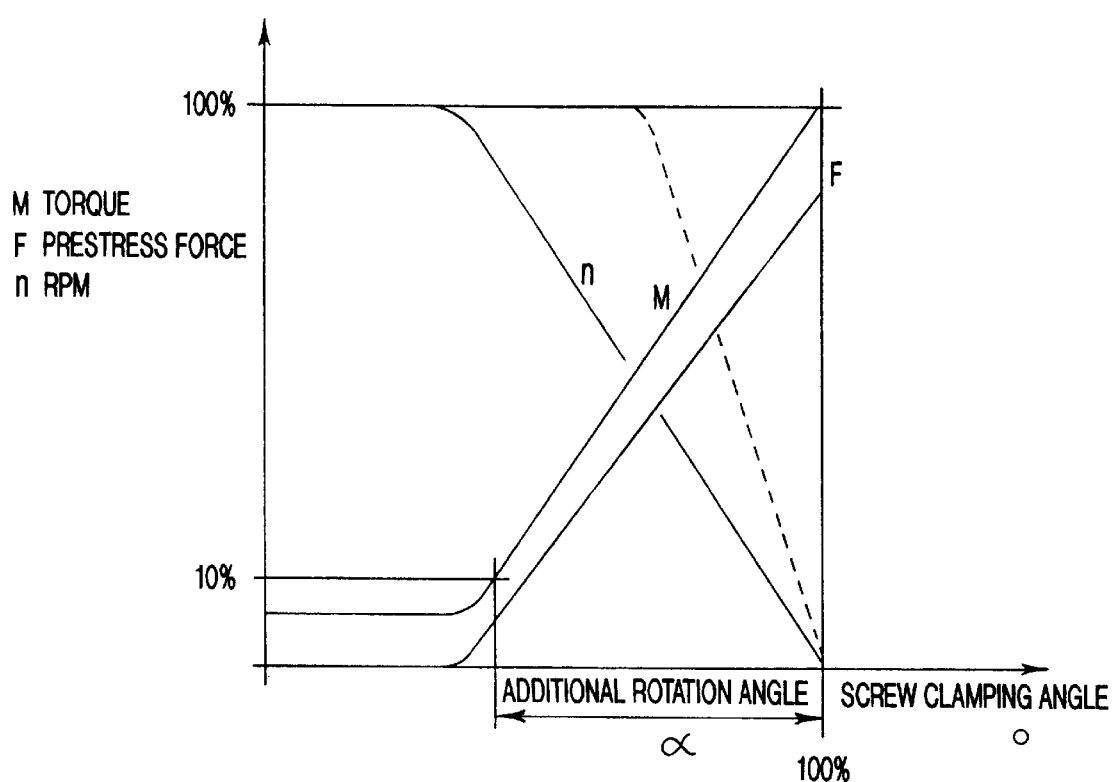
FIG. 2 a graphic representation of the course of the torque M, the prestress force F, and the rpm end as a function of the screw clamping angle.

FIG. 2 shows that the torque M when first turning the screw until reaching the connecting point, is first at a low value and, only after surpassing 10% to 20% of the torque corresponding to the nominal prestress force, will it increase linearly with the screw clamping angle. Accordingly, the initial point for additional rotation angle a at 10% to 20% of the torque corresponding to the nominal prestress force and this further rotation angle a is correspondingly 20% to 80% of the nominal screw clamping angle corresponding to the nominal prestress force which clamping angle can be precisely monitored.

The rpm in the drive unit 2 can be controlled inventively such that it will be reduced continuously with decreasing difference between the nominal torque and the actual torque or between the nominal screw clamping angle and the actual screw clamping angle and such that, upon reaching the nominal torque or the nominal screw clamping angle, will reach 0, i.e., the drive unit is switched off. This reduction of the rpm of the drive unit 2, as represented, can be linear, but it is also possible to provide a non linear course. It is especially possible to perform the tightening first at high rpm and, only after reaching a preset torque to reduce the rpm. This results in a shortening of the tightening process. The rpm control is shown in FIG. 2 in dashed lines.

With the inventive power screwdriver the operation is considerably facilitated by eliminating error sources, the screw prestress force can be achieved more easily and the limitation of the rotational energy of the drive unit as a function of the already dispensed moment of the screw tightening is limited so that a gear and material protection as well as a substantially independence of the switch-off moment from the torque course over time of the screw tightening results.

Furthermore, it is possible to design the sensing device 10 for the actual torque at the inventive power screwdriver 1 such that it will measure the actual torque of an already tightened screw by further rotation and that the evaluation circuit 9 will determine based thereon the nominal torque and/or the nominal screw clamping angle for further tightening of the screw to a value that is determined based on the input data.

The present invention is, of course, in no way restricted to the specific disclosure of the specification and drawings, but also encompasses any modifications within the scope of the appended claims.

What is claimed is:

1. A power screwdriver (1) comprising:
   a drive unit (2),
   an input circuit (6) for inputting a screw size, a material quality, a pitch, and a clamping length of a screw;
   an evaluation circuit (9) for determining a nominal prestress force based on input screw size, material quality, and clamping length, for determining a nominal torque based on the nominal prestress force and the pitch, and for determining the screw clamping angle resulting from the nominal prestress force and the pitch,
   a sensing device (10) for sensing the actual torque,
   a sensing device (11) for sensing the actual screw clamping angle,
   a control and switch-off device (12) for controlling further rotation of said drive unit (2) when the actual torque coincides with the nominal torque and for switching off said drive unit (2) when the actual screw clamping angle coincides with the nominal screw clamping angle;
   wherein the nominal torque, based on which the additional rotation of said drive unit (2) is controlled until the nominal screw clamping angle is reached, is set to a value which is smaller than the torque corresponding to the nominal pretension force; and
   wherein an additional rotation angle of said drive unit (2), for reaching the nominal screw clamping angle corresponding to the nominal prestress force, is determined based on the difference between the nominal screw clamping angle and the adjusted screw clamping angle corresponding to the preset nominal torque and is used for switching off said drive unit (2).

2. A power screwdriver according to claim 1, wherein the preset nominal torque corresponds to 10% to 20% of the torque corresponding to the nominal prestress force and the additional rotation angle is 90% to 80% of the nominal screw clamping angle corresponding to the nominal prestress force.

3. A power screwdriver according to claim 1, wherein said input circuit (6) is adapted to receive as additionally input a nominal torque, wherein said control and switch-off device (12) continuously reduces the rpm of said drive unit (2) with decreasing difference between the nominal torque and the actual torque and switches off said drive unit (2) when the actual torque coincides with the nominal torque.

4. A power screwdriver according to claim 1, wherein said evaluation circuit (9) determines a nominal torque based on input screw size, pitch, and material quality, wherein said control and switch-off device (12) continuously reduces the rpm of said drive unit (2) with decreasing difference between the nominal torque and the actual torque and switches off said drive unit (2) when the actual torque coincides with the nominal torque.

5. A power screwdriver according to claim 1, wherein said evaluation circuit (9) determines a nominal screw clamping angle based on screw size, pitch, material quality and clamping length, wherein said control and switch-off device (12) continuously reduces the rpm of said drive unit (2) with decreasing difference between the nominal screw clamping angle and the actual screw clamping angle and switches off said drive unit (2) when the actual screw clamping angle coincides with the nominal screw clamping angle.

6. A power screwdriver according to claim 1, wherein said sensing device (10, 11), for determining the nominal torque, measures the actual torque of an already tightened screw by a slight further rotation, wherein said evaluation circuit (9) determines, based on the actual torque of the already tightened screw, a nominal torque and/or a nominal screw clamping angle for further tightening of the already tightened screw to a value based on the input data.

* * * * *